April 30, 1968 R. J. FLAHERTY ETAL 3,381,282

CORE MATRIX WINDING PATTERN

Filed April 6, 1964 2 Sheets-Sheet 1

INVENTORS
ROBERT J. FLAHERTY
HERBERT J. HALLSTEAD
ROBERT L. JUDGE
RAYMOND L. VAUDREUIL
JOHN W. WYCKOFF
CHARLES J. SCHUG

BY

Carl C. Kling
ATTORNEY

United States Patent Office 3,381,282
Patented Apr. 30, 1968

3,381,282
CORE MATRIX WINDING PATTERN

Robert J. Flaherty, Pleasant Valley, Herbert J. Hallstead and Robert L. Judge, Poughkeepsie, Raymond L. Vaudreuil, Wappingers Falls, and John W. Wyckoff, Poughkeepsie, N.Y., and Charles J. Schug, Winchester, Hants, England, assignors to International Business Machines Corporation, New York, N.Y., a corporation of New York Filed Apr. 6, 1964, Ser. No. 375,683
(Filed under Rule 47(a) and 35 U.S.C. 116)
6 Claims. (Cl. 340—174)

ABSTRACT OF THE DISCLOSURE

This invention teaches a winding pattern that is useful with ferrite core memories that are wound according to U.S. Patent 3,314,131 which issued to R. L. Judge. In the method of Judge, two of the three sets of wires are wound in the same dimension of the core plane with the wires of one of these two sets offset at the midpoint of each row from one row to a different row. The offset is formed by first threading the wires in straight rows and then shifting one half of the core plane with respect to the other half.

This invention provides an interconnection of the wires of one of these two sets for canceling electrical noise when one set functions as a plurality of drive wires carrying half select currents and the other set functions as a sense-inhibit winding.

The winding pattern is also useful with manually wound core planes.

CHARACTERISTICS OF INVENTION

*Environment*

Magnetic core matrix winding patterns of several types are known to the art. These winding patterns generally include an orthogonal matrix of X and Y drive windings and a sense winding which is in checkerboard or figure 8 fashion to provide a balancing of half select noise. Half select noise signals occur as a result of the small excursions made by half selected cores along the X and Y windings which are energized in order to select the core at their intersection. Because of the relatively great number of cores, it is possible for the currents and voltages generated as a result of the sum of the half select noise signals to be greater than the output signal from the selected core. Accordingly, it is the usual practice to divide the cores on a sense winding into two groups, by checkerboarding the sense winding or by giving it a figure 8 characteristic. The polarity of the half select signals in the first group is opposite to the polarity of signals in the other group. Since the number of cores in each group is the same, the oppositely polarized signals are equal and provide complete cancellation. Modern techniques have been worked out for machine winding the X and Y wires in a core plane but it is the usual practice to perform certain manual operations in achieving the figure 8 sense winding.

*Objects*

An object of the invention is to provide a winding configuration for a magnetic core plane which configuration permits physically straight sense windings to have half select noise balancing.

A further object of the invention is to achieve a straight sense winding with half select noise balancing by providing an offset to the parallel one of the other drive windings.

Another object of the invention is to provide a winding configuration compatible with machine winding techniques.

*Features*

A feature of the invention is an *n*-row offset of the X winding at its midpoint, which offset permits a straight wire inhibit sense winding, with jumpering, to have the desired half select noise balancing relationship in a magnetic core matrix.

Another feature of the invention is a jumpering configuration for a magnetic core matrix which permits straight inhibit-sense winding wires and X winding wires which are offset at their midpoints by a constant K number of rows to achieve a noise balanced relationship. Another feature is a balanced sense winding without crossovers.

*Advantages*

The basic advantage of the invention is that it permits complete mechanization of the core matrix plane winding operation. A core threading machine can mechanically wind the X and Y windings. The matrix of cores threaded by X and Y windings can then be offset by K rows at the midpoint of the X windings. It is then possible to insert straight sense windings parallel to the X windings. After this insertion each straight sense winding traverses the group of cores threaded by the first half of X winding $n$ and the group of cores threaded by the second half of X winding $(n+K)$.

The foregoing and other objects, features and advantages of the invention will be apparent from the following more particular description of preferred embodiments of the invention, as illustrated in the accompanying drawings.

DESCRIPTION OF EMBODIMENTS

*Drawings*

*Summary*

The invention is a magnetic core matrix winding pattern which permits the use of straight wires to form the sense winding while retaining an electrical balance with respect to half select noise effects. A number of magnetic cores 1 are mounted at intersections of X windings 2*a*–2*d* and Y windings 3*a*–3*d*. Additional X windings 5*a*–5*d* are shown to demonstrate expansion capability. The X windings are not kept straight, but rather are offset at their midpoint by two rows. This two row offset permits straight sense winding wires 4*c*–4*h* to thread the cores. Jumpering of sense winding wires 4*a*–4*j* by jumpers 6*a*–6*i* forms the sense winding into a reentrant series connected winding which affects two equal groups of cores oppositely with respect to the X winding. Of the sixteen cores shown, a first group of eight are threaded by a first sense winding and a second group of eight are threaded by a second sense winding. The four cores threaded by a given X or a given Y winding are in two groups of two each, affecting the opposing sense winding in a manner calculated to allow cancellation of half select noise by a differential sense amplifier. Each row conductor, which may be identified X wire $n$, is offset by a constant number of rows K. Each sense wire thus threads the first group (half of the cores) of X wire $n$ and the second group (half of the cores) of X wire $(n+K)$. Connections of the sense wires to the cores and to differential sense amplifiers permit balancing of half select noise between groups both at X time and Y time.

*Example*

Figure 1:
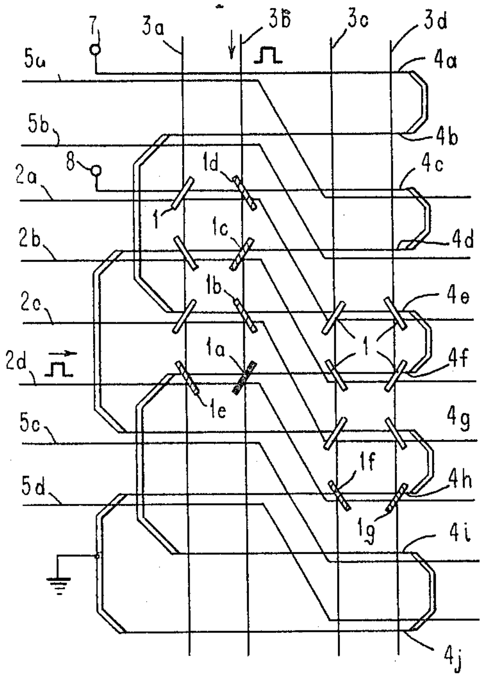
FIGURE 1 is a simplified schematic drawing of a wired core plane according to the invention.

FIGURE 1 shows an example of operation. It is assumed that X winding 2*d* and Y winding 3*b* are provided with half select current, in order to provide full select current to core 1*a*. Core 1*a*, shown in black, thus can provide an output signal. Six other cores, however, are half selected and provide half select noise outputs. Cores 1*b* to 1*d* are simultaneously half selected by the Y half select current, and cores 1*c* to 1*g* are simultaneously half selected by the X half select current. The half selected cores are shown shaded.

Half select noises from cores 1*b* and 1*e* appear at terminal 7. Half select noises from cores 1*c*, 1*d*, 1*f* and 1*g* appear at terminal 8. The full select signal from core 1*a* appears at terminal 7.

Operation ordinarily involves a staggered read drive, the X read drive pulse preceding the Y read drive pulse by an interval sufficient to dissipate X half select core noise and the capacitively coupled drive pulse noise. At the rise of the X read drive pulse, cores 1*e* and 1*a* produce half select noises at terminal 7, and cores 1*f* and 1*g* produce half select noises at terminal 8. These half select noises balance across a differential amplifier connected across terminals 7–8. Additional cores added to the rows are paired similarly to cores 1*e* and 1*g* and do not alter the balance. The X read drive pulse capacitively coupled rise transient passes equally to terminals 7 and 8, because the first half of X wire 2*d* is closely parallel to the first half of inhibit sense wire 4*f* connected to terminal 7, and the second half of X wire 2*d* is closely parallel to the second half of inhibit sense wire 4*h* connected to terminal 8.

The Y read drive pulse, since it is at right angles, produces a relatively small capacitively coupled rise transient, but this small coupling produces balanced signals at terminals 7 and 8 because the number of intersections of the Y wire and inhibit sense wires connected to each of terminals 7 and 8 is equal.

The Y read drive pulse on wire 3*b*, together with the X read drive pulse on wire 2*d*, generate magnetic fields which add at core 1*a*. Core 1*a* is fully selected and provides at terminal 7 the output which is the desired information.

Half select noises from cores 1*c* and 1*d* appear at terminal 8 at the rise of the Y read drive pulse. A half select noise from core 1*b* appears at terminal 7 simultaneously. In an actual memory, there would be several more Y half selected cores, but these would be balanced similarly to cores 1*b* and 1*d*. The maximum total imbalance of Y half select noises is one, and this is in opposition to the full select signal from core 1*a*. If core 1*a* holds a 0 and thus provides only a half select signal, the total imbalance is zero.

*Details*

FIGURE 1 shows the full matrix of three windings, X, Y and sense, labeled 2, 3, and 4. The sense winding can also serve as an inhibit winding if desired, in a bit organized or 3D memory.

Figure 2:
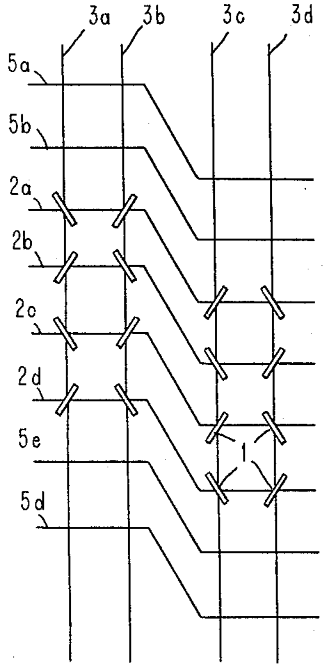
FIGURE 2 is a drawing of a matrix at an intermediate stage of production, showing cores at intersections of offset X lines and straight Y lines.

FIGURE 2 shows only X windings 2 and Y windings 3 with cores 1. Additional X windings 5*a*–5*d*, not equipped with cores, are shown. It is obvious that in a practical memory the number of cores is increased greatly, to the extent of 64 x 64 matrices or larger. The relationships shown, however, are retained.

Figure 3:
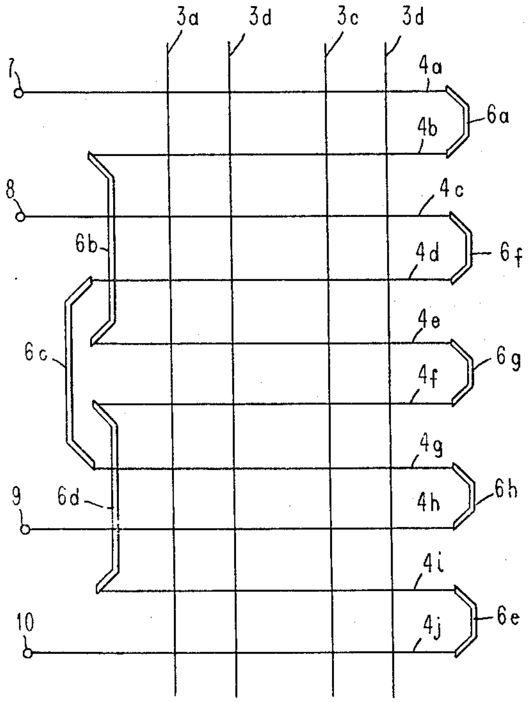
FIGURE 3 is a diagram of the inhibit sense winding.

FIGURE 3 shows only the sense windings. Jumpering provides continuity. If desired, terminals 9 and 10 may have a common ground connection. The sense winding is balanced with respect to half select noise caused by the X half select current and also is balanced with respect to half select noise caused by the Y half select current.

Figure 4:
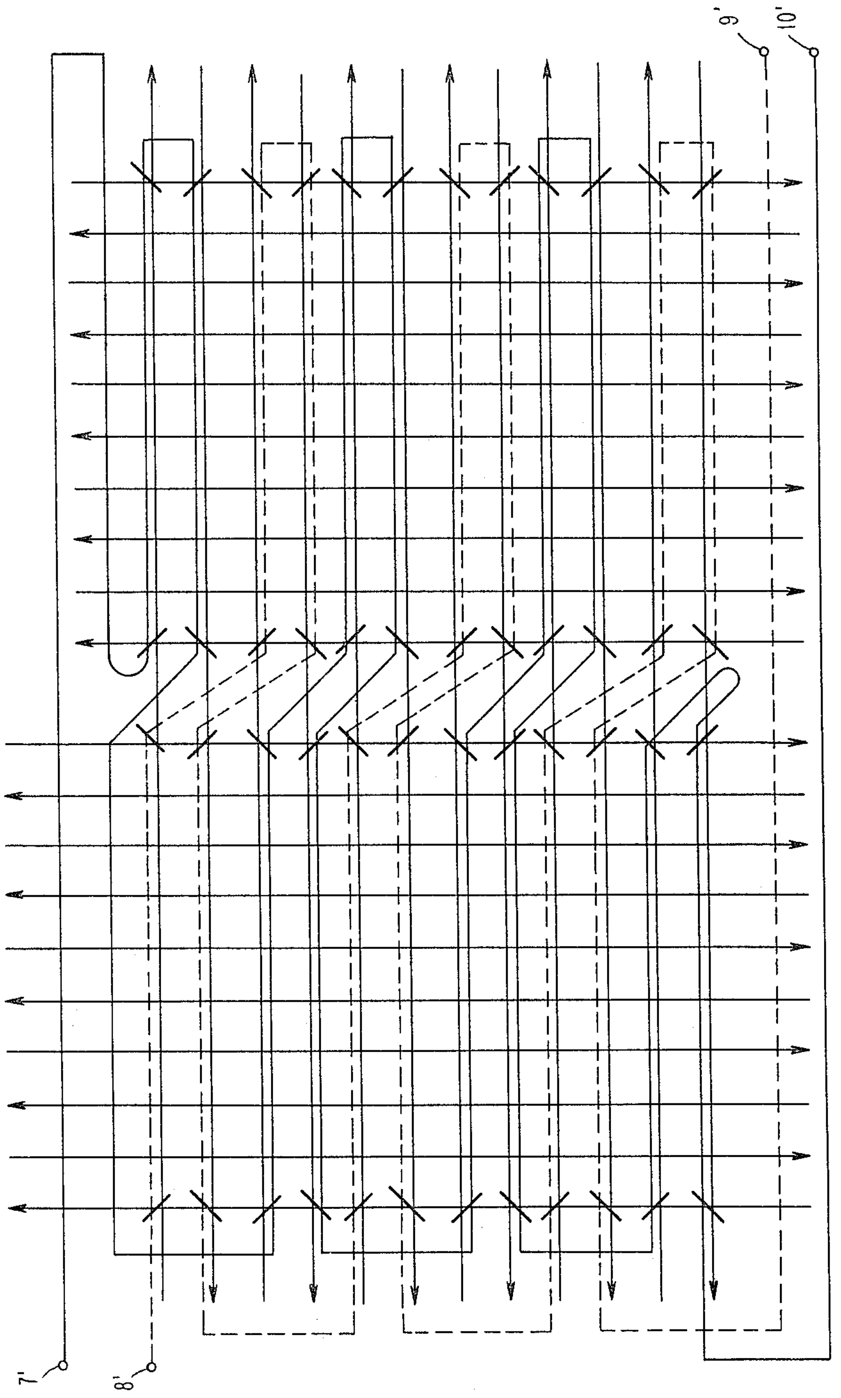
FIGURE 4 is a diagram of a second embodiment.

FIGURE 4 shows a second embodiment, in which the X and Y windings are straight and the inhibit sense wires have two portions which are offset. This offset can occur in the middle of a frame so that the sense wire may be threaded in two straight-through operations. This embodiment is more appropriate for manual wiring techniques.

To ensure balancing, it is necessary to have a half length loop, folded back adjacent to itself, at each end of one of the two inhibit sense windings, to square up with the X windings. Each inhibit sense wire traverses an equal number of core groups.

The X conductor, while straight, is offset by K rows with respect to the inhibit sense conductor. If each row is defined with respect to the X wire, each inhibit sense wire threads all the cores of a first group (left half) of cores threaded by core wire $n$ and threads all the cores of a second group (right half) of cores threaded by row wire $(n+K)$.

If manual techniques are used, the core winding wires may be returned without termination on the frame. For most purposes, however, wires are brought out to a frame and connected by printed connections. Either manner of completing a series circuit may be referred to as "jumpering."

In FIGURE 4, the jumpering is effective to produce two balancing inhibit sense windings. The orientation of X and Y windings alternates on adjacent wires. The direction of the inhibit winding accordingly alternates on adjacent wires. To accomplish suitable sense balancing without interfering with the inhibit function, jumpering must maintain a fixed relationship between the X and the inhibit sense winding. Accordingly, the inhibit sense winding is jumpered at adjacent terminals on one side of the matrix and jumpered to skip over a pair of adjacent terminals on the other.

*Variations*

In the preferred embodiments shown, each X winding is offset by two rows at its midpoint. It is within the scope of the invention to offset at a position other than the midpoint, to offset at several points such as at quarter pionts, or to offset by other than two rows, so long as the result of the offsets are to divide the cores threaded by the winding into a plurality of groups with substanitally equal half select noise characteristics.

The core groups must be paired so that one group can be coupled to one side of a differential sense amplifier while the other side is coupled to the other side of the differential sense amplifier, and must contain substantially equal numbers of cores with respect to windings which half select cores.

FINAL SUMMARY

The invention is a magnetic core matrix winding configuration which permits straight inhibit sense wires to be balanced with respect to half select noise. The straight wires are compatible with machine winding techniques. The drive winding which is generally parallel to the inhibit sense winding (normally the X winding) is offset at a midpoint to divide its cores in equal groups between a plurality of sense wires. The sense wires may be connected across a differential amplifier to achieve sensing capability with balancing of half select noise.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic core plane made up of a matrix of first-wires and second-wires essentially orthogonal to each other, threading magnetic cores at each of a multiplicity of intersections, and a plurality of third-wires threading such cores, characterized by:

a K-row offset of said first-wires at a mid-point of cores threaded by the matrix, which offset divides the cores threaded by said first-wires so that a first group of cores threaded by first-wire $n$ is essentially in line with a second group of cores threaded by first-wire $(n+K)$;

straight third-wires threading all the cores of the first group of cores threaded by said first-wire $n$ and the second group of cores threaded by said first-wire $(n+K)$;

a jumpering configuration for said third-wires, which third-wires include first, second, third, fourth, fifth, sixth, seventh . . . fourth from last, third from last, second from last and last third-wires, in which the first, third, third from last and last third-wires terminate respectively at first, second, third and fourth terminals;

said first-second, third-fourth, fifth-sixth . . . and second from last-last third-wires are jumpered together at a first side of the matrix; and said second-fifth, said fourth-seventh and remaining third-wires are jumpered together, skipping two third wires, at a second side of said matrix, opposite said first side, to complete a series circuit between said first and said fourth terminals, and to complete a series circuit between said second and said third terminals.

2. A magnetic core plane made up of a matrix of first-wires and second-wires essentially orthogonal to each other, threading magnetic cores at each of a multiplicity of intersections, and a plurality of third-wires threading such cores, characterized by:

a K-row offset of said first-wires at a midpoint of cores threaded by the matrix, which offset divides the cores threaded by said first-wires so that a first group of cores threaded by first-wire $n$ is essentially in line with a second group of cores threaded by first-wire $(n+K)$;

straight third-wires threading all the cores of the first group of cores threaded by said first-wire $n$ and the second group of cores threaded by said first-wire $(n+K)$;

a jumpering configuration of said first-wires, which first-wires include first, second, third, fourth, fifth, sixth, seventh . . . third from last, second from last and last double first-wires, and first, second, third and fourth single first-wires, in which said first single first-wire terminates in a first terminal, said first double first-wire terminates in a second terminal, said last double first-wire terminates in a third terminal, and said fourth single first-wire terminates in a fourth terminal;

said first-second, third-fourth, fifth-sixth . . . and second from last-last double first-wires are jumpered together at a first side of the matrix;

said first-second single first-wires are jumpered together at said first side of the matrix;

said third-fourth single first-wires are jumpered together at an intermediate point of said matrix between said first side and an opposite second side;

said second single first-wire is jumpered from its unjumpered end at an intermediate point of said matrix to the end of said third double first-wire at said second side of said matrix;

said third single first-wire is jumpered at said second side of said matrix to said third from last double first-wire;

said second-fifth, said fourth-seventh and remaining double first-wires are jumpered together at said second side of said matrix to complete a series circuit between said first and said fourth terminals, and to complete a series circuit between said second and said third terminals.

3. A magnetic core array made up of a plurality of core planes, each plane including a matrix of X wires and Y wires, essentially orthogonal to each other, threading magnetic cores at each of a multiplicity of intersections in such fashion that selection of an individual X wire and an individual Y wire selects one core in each of said core planes, and including a plurality of paired common inhibit sense windings, at least one pair for each core plane, characterized by:

(a) a simple relative offset of said X wires and said common inhibit sense wires at intermediate positions of the matrices; and (b) jumpering means interconnecting said common inhibit sense windings within their respective core planes to form pairs of series connected windings balanced with respect to the number of half selected cores on each winding of each of said pairs.

4. A magnetic memory having X wires and Y wires arranged respectively in rows and columns of a core plane, magnetic cores located at intersections of the X and Y wires and oriented on alternate diagonals such that alternate X wires and alternate Y wires have one polarity relationship for operations on the memory and the other X and Y wires have the other polarity relationship for operations on the memory, and inhibit-sense wires wound parallel to the X wires and interconnected to form a pair of inhibit-sense windings, characterized by:

(a) a two row relative offset between said X wires and said inhibit-sense wires at the midpoint of each row, whereby each inhibit-sense wire is coupled on opposite sides of the midpoint to two different X wires having the same polarity relationship, and (b) jumpering means interconnecting said common inhibit-sense wires to form a pair of series connected windings balanced with respect to the number of half selected cores on each winding of said pair for reducing noise during a read operation and having a uniform polarity relationship to said X wires for an inhibit operation.

5. A memory according to claim 4 in which said X wires are each wound through all of the cores of an associated row and said sense wires are offset two rows to be coupled on one side of the midpoint to cores of one row and on the other side of the midpoint to cores of a different row.

6. A memory according to claim 5 including jumpering means along one side of the core plane interconnecting the first-second, third-fourth . . . and second from last-last rows, whereby pairs of sense wires form a conductive loop coupled to portions of four different consecutive X wires and have a uniform polarity relationship to the X wires for an inhibit operation.

References Cited

UNITED STATES PATENTS

| | | | |
|---|---|---|---|
| 3,048,827 | 8/1962 | Wright et al. | 340—174 |
| 3,111,651 | 11/1963 | Foulkes | 340—174 |
| 3,210,735 | 10/1965 | Heijn. | |

BERNARD KONICK, *Primary Examiner.*

STANLEY M. URYNOWICZ, Jr., *Examiner.*